United States Patent [19]

Byerley et al.

[11] Patent Number: 4,517,067
[45] Date of Patent: May 14, 1985

[54] DISCRETE PARTICULATE BIPOLAR REACTOR

[76] Inventors: John J. Byerley, 154 Chelford Crescent; Kurt Enns, 345 Dale Crescent, both of Waterloo, Ontario, Canada

[21] Appl. No.: 461,279

[22] Filed: Jan. 26, 1983

[30] Foreign Application Priority Data

Sep. 29, 1982 [CA] Canada .................................. 412431

[51] Int. Cl.$^3$ .............................................. C25B 13/04
[52] U.S. Cl. .................................... 204/255; 204/283; 204/294; 204/1 R
[58] Field of Search ............... 204/254, 255, 256, 260, 204/268, 269, 270, 272, 284, 290 R, 294, 1 R

[56] References Cited

U.S. PATENT DOCUMENTS

| | | | |
|---|---|---|---|
| 1,312,756 | 8/1919 | Stover | 204/268 |
| 3,761,383 | 9/1973 | Backhurst et al. | 204/268 |
| 3,766,034 | 10/1973 | Veltman | 204/290 R |
| 3,919,062 | 11/1975 | Lundquist, Jr. et al. | 204/254 |
| 4,269,689 | 5/1981 | Agladze et al. | 204/268 |

FOREIGN PATENT DOCUMENTS

| | | | |
|---|---|---|---|
| 2148402 | 4/1972 | Fed. Rep. of Germany | 204/269 |
| 1194181 | 6/1970 | United Kingdom | 204/284 |

OTHER PUBLICATIONS

Fleischmann et al, Symposium on Electrochemical Engineering, vol. I, Newcastle, Northumberland, England, (1971), 1.53–169, "The Electrochemical Bipolar Particulate Cell".

Primary Examiner—Winston A. Douglas
Assistant Examiner—Terryence Chapman
Attorney, Agent, or Firm—Daryl W. Schnurr

[57] ABSTRACT

An electrochemical bipolar reactor has numerous conductive particles held in a fixed relationship to one another with non-conductive material wedged between at least some of the particles to electrically insulate those particles from other particles. In one embodiment, the conductive particles are separated into discrete layers by layers of non-conductive material. In another embodiment, the conductive particles are each partially covered with a layer of non-conductive material. In either case, the non-conductive material is pervious so that electrolyte can readily contact the conductive particles. The reactor has a low void volume and current leakage is minimized. The reactor of the present invention is particularly suited to process high volume wastes and can be constructed easily without machine parts. Also, the reactor can be operated over a wide range of conditions.

8 Claims, 8 Drawing Figures

DISCRETE PARTICULATE BIPOLAR REACTOR

BACKGROUND OF THE INVENTION

1. Field of the Invention

This invention relates to an electrochemical bipolar reactor for processing industrial wastes. In particular, this invention relates to a reactor containing conductive particles held in a fixed relationship to one another with non-conductive material wedged between some of the particles.

2. Description of the Prior Art

Bipolar electrochemical reactors are known. One such reactor is described in U.S. Pat. No. 3,900,377. The reactor or cell described in that patent has numerous ported bipolar electrodes or plates contained within the reactor together with primary electrodes. These bipolar electrode plates tend to be fragile, as well as being expensive to manufacture at present. In addition, the reactor must be operated under relatively precise conditions. Although the type of reactor described in U.S. Pat. No. 3,900,377 is suitable and economical for processing small quantities of wastes (e.g. 10–20 tons per day), it is not practical or economical for scaling up to treat wastes at the rate of 100–2,000 tons per day commonly produced in various hydrometallurgical and industrial processes.

There are known bipolar electrochemical reactors having a series of bed sections containing electrically conductive particles. In these reactors, the conductive particles are generally contained in fluidized beds but the beds are separated from one another by insulated spacers. These reactors can suffer from a disadvantage in that they have a relatively high void volume and can occupy a relatively large space because of the distance between adjacent insulating spacers. In addition, these reactors can be expensive because they must be constructed in a very precise manner with an appropriate distance between insulating spacers and each insulating spacer must be independently supported. In addition, when fluidized beds are used to process industrial waste, numerous problems can be encountered. If the particles are not substantially uniform in size, the finer particles can become lodged in the openings in the insulating spacer and thus reduce the flow of electrolyte through the reactor. When graphite particles are used, even if the particles are initially the same size, the particles are frangible and fine particles are produced after a relatively short period of operation. Again, the fine particles can become lodged in the openings in the insulating spacer and reduce the flow of electrolyte through the reactor. The flow rate of fluidized beds is often extremely critical and expensive flow control means are often required. In addition, when gas bubbles are produced during the electrolysis reaction, they tend to adhere to the particles within the fluidized bed. When this occurs, the particles rise to the top of the fluidized bed and can block the flow of electrolyte. If the industrial waste being treated contains plateable metals, as metal becomed plated onto the particles, the density of the particles changes and the flow rate of the fluidized bed must be adjusted. Also, if the industrialized waste being treated contains suspended solids, unless the solids content is very low or the waste is filtered before entering the electrochemical reactor, the waste cannot be processed in a fluidized bed system. Finally, because fluidized beds have a relatively large void volume, the voltage drop is usually much larger than that of a bipolar reactor containing particles with a relatively low void volume. If the voltage drop is higher with fluidized beds, then the cost of processing is higher. A serious problem with all fluidized or semifluidized bed reactors is the high degree of current leak. Current leak is defined as the current which passes through the interstitial solution between the primary electrodes without passing through the conductive particles. The current (energy) leak does not function to make the conductive particles bipoles. The energy is simply dissipated as heat. The percent current leak is inherently high in all partially expanded or fluidized bed reactors. For example, in tests with conductive beds of graphite particles ranging from 0.8 to 1.2 mm, a current leak of about 70% was experienced for a bed expansion of 50%. The current leak increased to about 80% for a bed expansion of 100–120%. Thus, although in theory a fluidized bed bipolar system provides potentially large anodic an cathodic surface area per unit mass of conductive charge and would therefore appear to be the ideal bipolar electrode reactor, problem relating to hydrodynamic, flow control, particle abrasion and current leakage can render such a system impractical for large scale industrial applications.

It is an object of the present invention to provide a discrete particulate bipolar electrochemical reactor that overcomes the problems above and can be easily constructed with readily attainable materials. It is a further object of the present invention to provide a bipolar electrochemical reactor that is rugged, durable and simple to operate.

SUMMARY OF THE INVENTION

In accordance with the present invention, an electrochemical bipolar reactor comprises a reactor tank having an inlet and outlet and an innert inner surface. Numerous conductive particles are contained in a reaction zone between said inlet and outlet. The particles are held in a fixed relationship to one another and each particle or small group of particles is at least partially covered with a fluid permeable membrane of non-conductive material so that each particle or small group of particles is electrically insulated from adjacent particles or adjacent small groups of particles. The conductive particles are located between two primary electrodes. One primary electrode is located at a start of the reaction zone and another primary electrode is located at the end of the reaction zone. The primary electrodes are insulated from the particles by a layer of non-conductive material. The particles are essentially piled on top of one another from a bottom to a top of the reactor tank. There are means for applying an electrochemical potential across said primary electrodes.

Preferably, each particle or small group of particles is contained in a fluid permeable membrane of non-conductive material. Still more preferably, the fluid permeable membrane is a pervious sack.

DESCRIPTION OF THE DRAWINGS

In drawings which illustrate a preferred embodiment of the invention.

DESCRIPTION OF A PREFERRED EMBODIMENT

Figure 1:
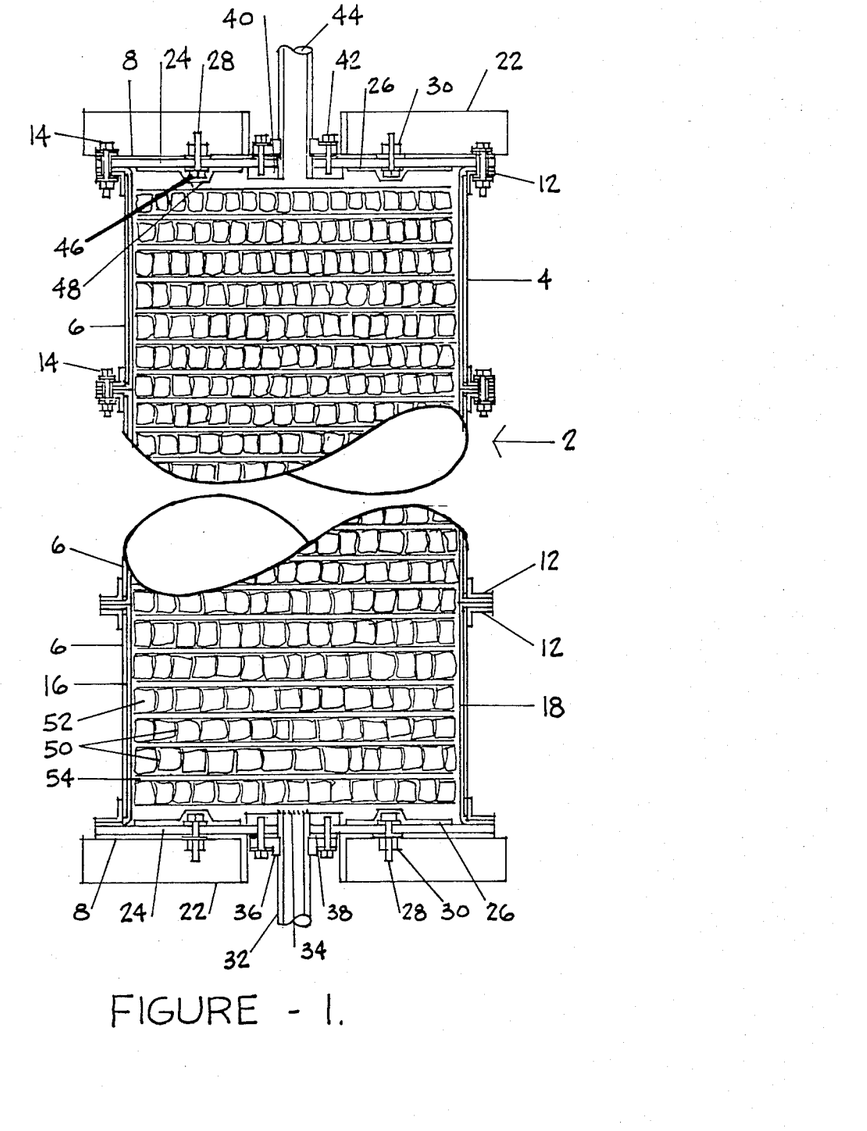
FIG. 1 is a partial sectional side view of an embodiment of the reactor where the conductive particles are arranged in discrete layers.

Referring to the drawings in greater detail, in FIG. 1, there is shown one embodiment of an electrochemical bipolar reactor 2 having a reactor tank 4 made up of cylindrical modules 6 and end plates 8. Each module 6 has a flange 12 at each end extending around the circumference. The flange 12 has a plurality of holes that are equidistant from one another so that two or more modules 6 can be bolted together by bolts 14. The end plates 8 contain similar holes and are bolted to the flange 12 of the appropriate module 6 by bolts 14. Covering an inner surface 16 of each module 6 is an electrically insulating material 18.

The end plates 8 are each reinforced by webbs 22. Immediately adjacent to an inner surface of each end plate 8 is a non-conductive sheet 24. Immediately adjacent to an inner surface of the non-conductive sheet 24 is a primary electrode 26. The insulating sheet 24 extends to the periphery of the flange 12 and is bolted by the bolt 14 between the end plate 8 and the inert material 18.

The primary electrode 26 is bolted to the insulating sheet 24 by brass bolts 28 having non-conductive threaded seals 30.

In the centre of the lower end plate 8, insulating sheet 24 and electrode 26 is an inlet pipe 32. The inlet pipe 32 has a preferred cover 34 mounted thereon to disperse the electrolyte as it leaves the inlet pipe 32 and also to support the particles so that they do not extend into the inlet pipe 32 and interfere with the flow of electrolyte into the tank 4. Surrounding the inlet pipe 32 outside the tank 4 is a non-conductive threaded flange 36. Between the flange 36 and the insulating sheet 24 is a rubber gasket 38. Surrounding the inlet pipe 32 on the inside of the tank 4 is a reinforcing ring 40. Bolts 42 extend through the flange 36, rubber gasket 38, insulating sheet 24 into the reinforcing ring 40. This prevents any leaks around the inlet pipe 32 and also provides support for the particles in the centre area of the tank 4. At an opposite end of the tank 4, there is an outlet pipe 44 with a non-conductive threaded flange 36, gasket 38, reinforcing ring 40 and bolts 42. These components are arranged in the same manner as the corresponding components around the inlet 32. The threaded flange 36 can be constructed of any suitable material, for example, polyvinylchloride. The reinforcing ring 40 is preferably non-conducting but it can be of any workable material which is not degraded by the electrolysis process or by the solution. Heads 46 of the brass bolts 28 are shielded by lead covers 48.

As can be seen from FIG. 1, the two ends of the reactor tank 4 are mirror images of one another except that the outlet 44 does not have any perforated cover 34.

Within the reactor tank 4 there is a series of layers 50 of conductive particles 52 separated from one another by a non-conductive layer 54 wedged between each layer 50. The particles 52 of each layer 50 are placed side by side so that the particles 52 contact one another and the depth of the layer is the depth of the particles. The non-conductive layer 54 can be made up of various materials and can be of various sizes and shapes but it must be pervious to permit free flow of electrolyte through the reaction zone. In FIG. 1, the non-conductive layer 54 is two screens. The screens have a one-quarter inch mesh. Various other sizes of screens will be suitable depending on the use to be made of the reactor. The openings in the conductive layer must be sufficiently large so that they do not unreasonably interfere with the flow of electrolyte and yet sufficiently small that they insulate one layer from another. If the openings are too large, conductive particles from one layer will contact conductive particles in adjacent layers. Also, in some uses, it may be desirable to only use one screen in the non-conductive layer or more than two screens. Various materials are suitable for the non-conductive screens. For example, the screens could be made of glass fibre coated with polyvinylchloride.

Figure 2:
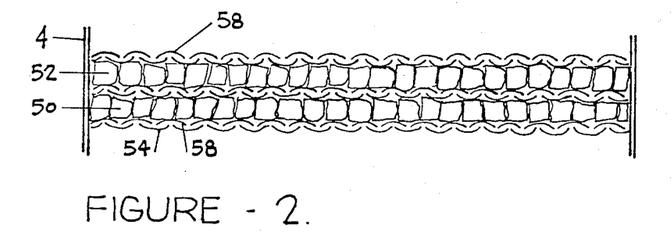
FIG. 2 is a partial sectional side view of a layer of conductive particles with plastic insulating material.
Figure 3:
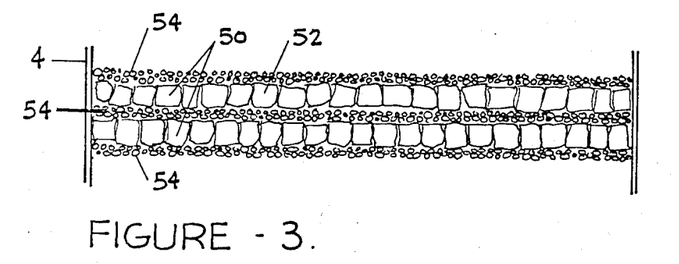
FIG. 3 is a partial sectional side view of a layer of conductive particles with a layer of non-conductive particles as the insulating material.

As shown in FIG. 2, the non-conductive layer 54 can be made up of ceramic Berl saddles 58 or similarly shaped commercially available ceramic or plastic shapes. It is not a requirement that the non-conductive layer 54 be a screen. It can be a layer of non-conductive particles and it can be of any desired thickness so long as it accomplishes the desired result (i.e. to insulate one layer of conductive particles from adjacent layers without unreasonably impeding the flow of electrolyte). As shown in FIG. 3, when the non-conductive layer 54 is a layer of non-conductive particles, various materials can be used, for example, crushed stone, granite chips, crushed coarse raschig rings, coarse granular plastic modules, etc.

As shown in FIGS. 1, 2 and 3, once the non-conductive layer 54 has a layer 50 of conductive particles 52 above and below it, the layer 54 can be said to be wedged between the layers 50.

The reactor tank 4 can be made of any suitable material, for example, steel or concrete. The inner surface 16 of the reactor tank 4 can be coated or covered with any suitable electrically insulating material 18, for example, rubber, epoxy, polyvinylchloride, ceramic coating, rubber, etc. Of course, depending on the type of reaction being carried out and the properties of the electrolyte, some materials 18 suitable with one electrolyte will not be suitable with another electrolyte. When the tank is made of concrete, it can usually be sealed internally with epoxy paint.

The reactor 2 does not require a separate support means for each layer of particles. Once the reactor tank has been constructed, it is a relatively simple matter to fill the tank with alternating non-conductive layers and layers of conductive particles. The layers of conductive particles are essentially piled on top of one another from the bottom to the top of the reactor with the non-conducting layers wedged or placed in between. While the reactor tank as shown in FIG. 1 is modular, for specific uses, the tank could be constructed to be one size only.

Figure 4:
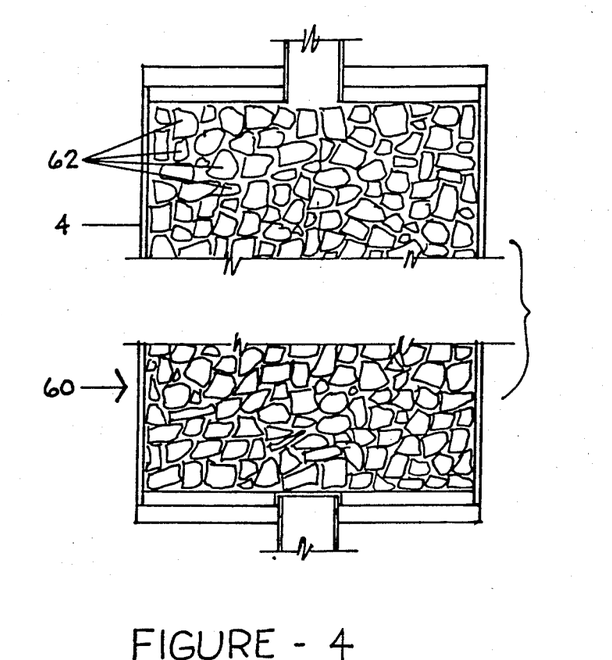
FIG. 4 is a partial sectional side view of a reactor where each particle is partially covered with non-conductive material.
Figure 5:
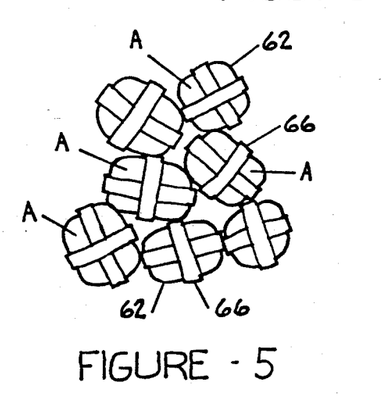
FIG. 5 is an enlarged partial side view of one manner in which each particle is partially covered with non-conductive material.
Figure 6:
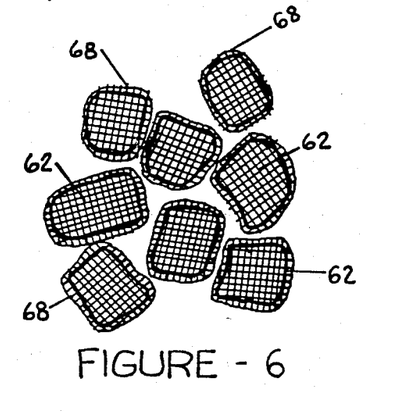
FIG. 6 is an enlarged partial side view of a variation in the manner in which each particle is partially covered with non-conductive material.

Referring to FIG. 4 in greater detail, a reactor 60 has a reactor tank 4 that is preferably identical to that shown in FIG. 1. However, the details of the reactor tank 4 have been omitted from the drawing. The conductive particles 62 within the reactor 60 are not arranged in layers but are simply randomly arranged within the reactor 60. Each conductive particle 62 is partially covered with non-conductive material 64. The non-conductive material 62 is not shown in FIG. 4 but is shown in FIGS. 5 and 6. The purpose of partially covering each particle with non-conductive material is to attempt to electrically insulate each particle from adjacent particles while still allowing the electrolyte to contact each particle. Thus, each individual particle will be a separate bipole within the reactor 2. The non-conductive material must be pervious so that the electrolyte can contact the conductive particles through the conductive material. Pervious is to be interpreted in this specification to mean either porous or perforated. When non-conductive material is not porous, it must be perforated. For example, the screens 54 are not made of porous material but they are perforated or pervious because they contain numerous openings to allow electrolyte to contact the conductive particles. When the non-conductive material is porous, it can completely surround the conductive particles because the electrolyte can still contact the conductive particles. In other words, the porous material is pervious. The porous non-conductive material is considered to only partially cover the conductive particles because the electrolyte can still contact the conductive particles.

The individual particles 62 can be partially covered with a non-conductive material in various ways. For example, as shown in FIG. 5, the mid-section of each particle could be covered with two bands 66 of non-conductive material that are normal to one another. Another way of attempting to insulate each conductive particle from adjacent particles would be to insert each particle 62 into a non-conductive, pervious sack or encasement 68 as shown in FIG. 6. The ends of the sack could be either open or closed. The sack is made in the form of a mesh to allow the electrolyte to contact the particles through the sack. Various other ways to attempt to electrically insulate each individual conductive particles from adjacent particles will be readily apparent to those skilled in the art. Of course, in practice, depending on the procedure used, some conductive particles will remain in electrical contact with other conductive particles. Therefore, instead of having each individual particle insulated from adjacent particles, some particles will be in electrical contact with adjacent particles. These particles will form a group of particles that are electrically connected to one another but insulated from all particles that are not within the group. Where two or more particles 62 are in direct contact with one another without any non-conductive material in between, the particles are in electrical contact with one another. These particles form a group of particles that are in electrical contact with one another but, as a group, are insulated from other particles. Thus, that group of particles will act as a separate bipole within the reactor. In FIG. 5, those particles 62 labelled A are in electrical contact with one another and form one group of particles. The remaining particles 62 in FIG. 5 are insulated from one another and from the particles in the group. When this manner of partially covering particles with a non-conductive material is utilized, there will be various other groups of particles within the reactor as well as many individual particles that are insulated from adjacent particles. Preferably, at least 50% of the conductive particles in the reactor are electrically insulated from adjacent conductive particles. Still more preferably at least 80% of the conductive particles in the reactor are electrically insulated from adjacent conductive particles. In other words, only 20% or less of the particles in the reactor form a group or groups of electrically connected particles. Each conductive particle that is electrically insulated from adjacent particles forms a separate bipole within the reactor.

Various materials can be used as the conductive particles. For example, graphite, coke, or briquetted carbon can be used. It has been found that crushed coke is not as efficient as graphite but the same result can be achieved with crushed coke by using a larger reactor. Since crushed coke is presently available at a much lower price than graphite, it is economically feasible to build a larger reactor using coke. The particles can be crushed to form a layer of a desired depth or the individual particles can be large enough so that the depth of a particle is the depth of a layer. Of course, any particles that are small enough to pass through or clog the openings in the non-conductive material should be removed before the particles are placed into the reactor. The suitability of conductive particles will generally vary with the electrolyte being processed.

In filling a multi-layered reactor of the type described above or reactor 2, the layer of non-conductive material of the insulating screen is placed into the bottom of the reactor first. This is followed by a layer of conductive particles topped by a layer of non-conductive material or insulating screen. Then another layer of conductive particles topped by a non-conductive layer is added until the desired number of layers has been placed within the reactor. The upper most layer of conductive particles must be covered by a layer of non-conductive material or insulating screen to insulate the upper most layer from the primary electrode located near the outlet 44. When the particles are not arranged in layers but simply randomly mixed in a reactor of the type described above as reactor 60, the conductive particles can be placed within the reactor simply by pouring them in from the top after the lower most layer of non-conductive material or insulating screen has been placed in the reactor. This bulk arrangement of particles is then topped by a layer of non-conductive material or insulating screen. Thus, the bulk arrangement of particles is insulated from each of the primary electrodes.

The reactor tank 4 can be constructed in various ways. It can be erected on site or prefabricated. The tank 4 shown in FIGS. 1 and 4 is not the most economical tank that could be constructed. For example, it would be more economical to extend the primary electrodes to the outside of the tank 4. Then, instead of using leaded-head brass bolts 28 for the electrical connections, the electrical connections would be made directly to the primary electrode. Also, if the end caps were made of thicker material, the webbs 22 would not be necessary. In addition, it is not necessary to have the inlet and outlet located in the end cap or even centrally located. The inlet and outlet could be located in the side of the reactor tank.

While the reactor is shown in a vertical position with the inlet at the bottom and the outlet at the top, in some uses it might be desirable to operate the reactor in another position such as horizontal position. However, if reactors of the type shown in FIG. 1 are operated in a horizontal position, more complicated support means for the conductive particles might be necessary when it is desired to have the particles held in a fixed relationship in discrete layers. With the reactor shown in FIG. 1, the particles are held in that relationship by the screens of non-conductive material and also by gravity. Also, gas generated in the reaction zone will always rise to the top. This could create a void in the tank 4 unless appropriate steps are taken to remove the gas. Of course, when the bulk of non-conductive particles are utilized as shown in FIG. 4, it would not be necessary to have any additional support means. As the conductive particles are arranged randomly in the reactor shown in FIG. 4, except for the problem of voids within the reactor, it would not make any difference if the reactor was operated vertically, horizontally or at any other angle. Also, the reactor could be operated with the inlet at the top and the outlet at the bottom (i.e. opposite to that shown in FIGS. 1 and 4). However, the gas generated in the reactor zone will again present a problem. Also, as the reactor is filled with electrolyte, voids may occur. Therefore, it is believed that the vertical position, with the inlet at the bottom and outlet at the top will achieve the most efficient results.

The primary cathodes can be made of various materials, for example, lead, graphite, stainless steel and even mild steel. The primary anode, subjected to electrooxidation conditions, can be made of various materials, for example, graphite or sheet lead, titanium or appropriate stainless steel.

The reactor of the present invention is suitable for treating numerous industrial wastes. For example, it is suitable for detoxication of aqueous thiocyanate solutions or recovery of cyanide from aqueous thiocyanate solutions. These solutions are generally large volume wastes which are found in many industrial areas including the hydrometallurgical processing of gold and silver ores. This process is described in detail in a co-pending application Ser. No. 404,388-0.

In operation, the waste solution to be processed is simply passed through the reactor from inlet to outlet while a suitable electrochemical potential is applied across said primary electrodes. Preferably, the inlet is located at a lower end of the reactor and the outlet at the upper end to reduce the possibility of creating voids or air pockets in the reactor. Various means can be used to pass the electrolyte through the reaction zone. These means are considered to be conventional and are not shown in the drawings.

Reactors of the type described above as reactor 2, 60 are less expensive than previous reactors to construct. One reason is that no separate support means is required for the conductive particles. Also, the reactor parts can be made without any precision machining being required. When the conductive particles are placed within the reactor, it is not necessary to ensure that separate layers of particles are a precise distance from adjacent layers. Successive layers of particles are separated only by the non-conductive layers wedged in between.

Reactors of the type described above as reactor 2, 60 overcome the problems of gas blockage encountered with previous reactors because the flow rate through the layers of conductive particles is relatively high. Any bubbles formed on the conductive particles are thought to be scrubbed away by the electrolyte. The gas bubbles remain small and do not coalesce into large bubbles which could lodge at various points and block electrode surface area. With aqueous electrolytes, oxygen is produced at the anode of the bipole and hydrogen is produced at the cathode. The volume of hydrogen produced is usually much greater than the volume of oxygen. The finely dispersed gas is thought to wash the cathode surfaces where the hydrogen ion is reduced. It is believed that the washing of the cathode surfaces by the oxygen at least partially changes the cathodic reaction from the hydrogen evolution reaction to the hydrogen discharge reaction. The latter reaction requires a lower potential than the former and the applied voltage to the reactor is lowered with the resulting lowering in the energy cost of processing. The switch of the cathodic reaction from the hydrogen evolution reaction to the hydrogen discharge reaction is referred to, in electrochemical terms, as depolarization of the cathode. To encourage greater depolarization and to keep suspended solids of the waste solution in suspension, it has been found that injecting air into the reactor feed pipe or inlet increases depolarization of the cathode. The air is thought to be immediately dispersed into very fine bubbles increasing the mass transfer of oxygen into the electrolyte by diffusion, thereby increasing the depolarization of the cathode. Further, these fine bubbles tend to attach themselves to solids already present in the waste being processed and prevent the solids from lodging between the particulates and reducing the reactor efficiency. Generally, the depolarization advantage is not worth the trouble of air injection. However, if the waste contains solids, particularly of the type that tend to coagulate, air injection is worth while as prefiltering the waste can sometimes be avoided.

The reactor of the present invention can handle waste with relatively high solids content. For example, the reactors 2, 60 can easily process cyanide heat treating waste containing 4% to 6% solids (mainly iron oxides) without blockage problems. Also, the reactor with the discrete fixed layers of conductive particles has been used to process synthetic waste of thiocyanate and 15% solid calcium sulphate without any blockage problem.

Reactors of the type 2, 60 described above are tightly packed relative to a fluidized bed reactor and current leakage is minimized. Current leakage will only rise above 30% if the solution being processed is highly conducting. Very few, if any, industrially produced wastes are highly conducting.

When metals (e.g. zinc, copper, cadmium) are deposited on planar cathodic bipole surfaces, they do not deposit evenly but as rough, nodular or dendritic coatings which grow at points to contact adjacent bipolar planar electrodes resulting in the electrical contact between adjcent electrodes, thereby converting two or more bipoles into one bipole. When the discrete multilayer reactor described in FIG. 1 was utilized with double layers of fibre glass screen (¼ inch mesh) as the layer of non-conductive material, it was found that the reactor was able to process zinc loadings from zinc-cyanide-thiocyanate wastes, which were about 60% higher than that for plate reactors, before any shorting occurred between adjacent layers of conductive particles. If the non-conductive layer was thicker, it is believed that even higher metal loadings could be processed.

As electrode wear occurs with the discrete fixed layer reactor, the total volume of the layers will shrink. The reactor can be recharged simply by filling the gap between the primary electrode at the top of the reactor tank and the first bipolar particulate layer with more layers of conductive particles and non-conductive material. When heavy wear of conductive particles has occurred, the reactor can be easily emptied and a new particulate charge can be inserted. The charge could be assembled into multi layers of alternating conductive particles and non-conductive material by manufacturers. The assembly could be made into a polyvinylchloride cylinder or cartridge with the contents of conductive and non-conductive materials cemented into a tight pack with an easily degraded polymeric cement, for example, acetate butyrate cellulose. The user of the reactor could simply purchase the whole unit, empty the reactor and insert the purchased unit. The cemented charge in the polyvinylchloride cylinder would be released from the polymeric cement by hydrolyzing the cement (after the cylinder has been inserted in the reactor) with, for example, hot caustic solution. When the bulk particles reactor 60 requires recharging, the top of the reactor can simply be removed and more conductive particles that are partially covered with non-conductive material can be added.

Usually, it is immaterial for reactor efficiency as to which primary electrode is the anode and which is the cathode. However, from the point of view of maintenance, it is usually better to have the anode at the top of the reactors 2, 60 and the cathode at the bottom. If the anode corrodes, it is generally accessible and easy to replace if it is located at the top of the reactor.

The conductive particles can be in various forms. For example, it has been found that 2.8×2.8 centimeter graphite cylinders that have been tumbled wet in a rotating drum are suitable conductive particles. The rotating drum produces graphite nodules with partially rounded ends as the edges are rounded by the tumbling action. When used in the discrete fixed layer reactor 2 described in FIG. 1, these nodules are then placed on what remains of the flat end portion of the cylinder side by side in a fixed relationship to form one layer of particles. The depth of the layer is the depth of each particle.

When waste containing a high concentration of solids is desired to be processed, it may be necessary to prefilter the waste before passing it through the reactor. It may be possible to process some waste containing a high solids content using pulsed flow.

Tests were conducted with a reactor of the type described in FIG. 1, containing discrete fixed layers of conductive particles having a cross sectional area of 2.2 square feet and a height ranging from 3'6" to 5'. The number of layers of conductive particles ranged from 36 to 54. The flow rate ranged from 11 to 88 gallons per minute and the geometric current density from 25 to 100 amps per square foot. Reactions were carried out at temperatures up to 120° C. This data is given as representative of one embodiment of the reactor only. Different reactors could be constructed in accordance with the present invention having various sizes and operating conditions from those described. Also, various arrangements of layers of conductive particles could be used within the scope of the claims.

The greater the distance between primary electrodes, the higher the voltage requirement. To avoid the high voltage requirements with long or tall reactor tanks (ie. >8 feet) that are filled with conductive particles, whether in layers or in bulk, additional primary electrodes could be interposed in the tank. These additional electrodes would have to be perforated to allow electrolyte to pass through and additional support means would be required. Also, instead of tall tanks with additional perforated primary electrodes, two or more reactors could be connected in series with provision for venting gases between the two reactors if necessary.

Figure 7:
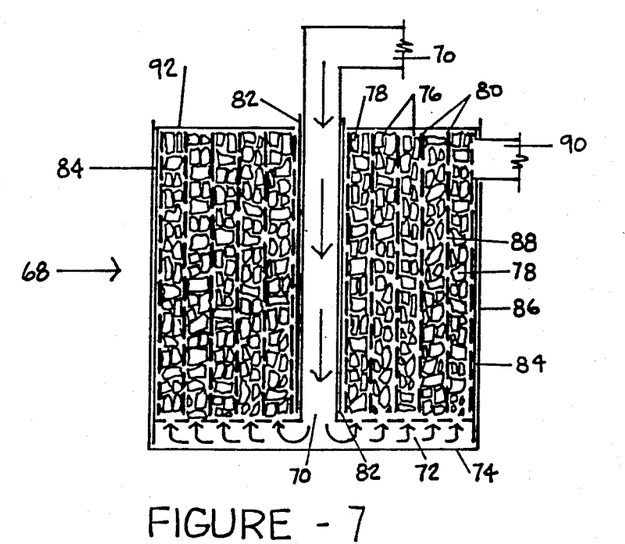
FIG. 7 is a schematic sectional side view of an annular reactor.

In FIG. 7, there is shown an annular discrete fixed layer particulate bipolar reactor 68. The reactor 68 has a circular cross-section (not shown) with an inlet 70 extending through the centre of the reactor 68 to a manifold 72 located at a base 74 of the reactor 68. A series of concentric layers 76 of conductive particles 78 surround the inlet 70. Each layer 78 is separated from an adjacent layer by concentric non-conductive layers 80 wedged between said layers 78. One primary electrode 82 is cylindrical in shape and is located betwween the inner-most layer 80 and the inlet 70. The other primary electrode 84 is also cylindrical in shape and is located between the outermost non-conductive layer 80 and a side wall 86 of the reactor 68. In operation, electrolyte flows into the inlet 70, down through the centre of the reactor 68 to the manifold 72. The electrolyte then flows upward through the layers 76 and the non-conductive layers 80. The non-conductive layers 80 have a series of perforations 88 therein so that the electrolyte can pass through from one layer to another but the conductive particles 78 cannot pass through. After passing through the reactor 68, the electrolyte leaves the reactor through an outlet 90 which is located near a top 92 of the reactor 68. The non-conductive layers 80 could be made of various materials, for example, perforated polyvinylchloride cylinder.

Figure 8:
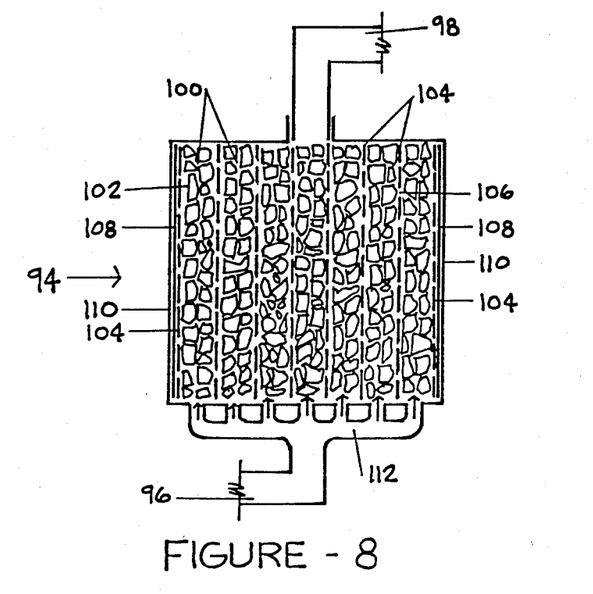
FIG. 8 is a schematic sectional side view of a rectangular reactor.

In FIG. 8, there is shown a rectangular discrete fixed layer particulate bipolar reactor 94 having an inlet 96 and an outlet 98. The reactor 94 has a rectangular cross-section (not shown) with a series of adjacent layers 100 of conductive particles 102 with a non-conductive layer 104 wedged between each layer 100. Each layer of non-conductive material contains openings 106 so that the electrolyte can readily pass through the layers 104 to contact the conductive particles 102. The primary electrodes 108 are located adjacent to each side 110 of the reactor 94 and are separated from the outermost layer 100 of conductive particles 102 by a layer of non-conductive material 104. In operation, electrolyte enters the inlet 96 and proceeds into a manifold 112 where it is dispersed to each of the layers 100, the electrolyte flowing through the reactor 94 in one direction, ultimately leaving the reactor through outlet 98. In FIGS. 7 and 8 the reactors 68, 94 are shown in schematic form only without any detail as to the reactor tank or the connection of primary electrodes to a power source. In addition, no insulators or insulating material were shown between the primary electrodes and the reactor tank. Also, no insulating lining for the reactor tank was shown. These and other aspects of the reactor tank can be utilized in a manner similar to that shown for the reactor tank of FIG. 1 or, as suitable for a particular use. If desired, the reactor tank could have been similar to that shown in FIG. 1. However, numerous variations in the reactor tank are possible. It is considered throughout that the connection of the primary electrodes to a power source and a pumping system to circulate electrolyte through the reactions are known to those skilled in the art and, therefore, no details are provided.

Throughout the drawings, for purposes of illustration, the space between adjacent conductive particles and, where applicable, non-conductive particles, is greater than the space that would be found in practical use. For example, in FIG. 4, many of the conductive particles 62 are shown as not contacting any adjacent particles. Since the particles 62 are simply piled into the reactor tank 4 in bulk, the particles would be in tight contact with one another in actual use.

In addition, there is a greater space shown between conductive particles and the adjacent layer of non-conductive material. For example, in FIG. 1, many of the conductive particles 52 are not in contact with the adjacent layer of non-conductive material 54.

Finally, when two or more screens are shown as the layer of non-conductive material, a greater space is shown between the screens than would occur in actual practice. For example, in both FIGS. 1 and 3, two screens make up each layer 54 of non-conductive material. However, the adjacent screens shown as not being in contact with one another. Of course, in actual practice, the screens would be in tight contact with one another.

Within the scope of the accompanying claims, various other configurations and shapes for the reactor and arrangement of the conductive particles, non-conductive materials, primary electrodes and inlets and outlets will be readily apparent to those skilled in the art.

The embodiments of the invention in which an exclusive property or privilege is claimed are defined as follows:

1. An electrochemical bipolar reactor comprising a reactor tank having an inlet and an outlet, said tank having an inert inner surface and containing numerous conductive particles in a reaction zone between said inlet and outlet, said particles being held in a fixed relationship to one another and each particle or small group of particles being at least partially covered with a fluid permeable membrane of non-conductive material so that each particle or small group of particles is electrically insulated from adjacent particles or adjacent small groups of particles, said conductive particles being located between two primary electrodes, one primary electrode being located at a start of said reaction zone and another primary electrode being located at an end of said reaction zone, said primary electrodes being insulated from the particles by a layer of non-conductive material, said particles being essentially piled on top of one another from a bottom to a top of the reactor tank and means for applying an electrochemical potential across said primary electrodes.

2. A reactor as claimed in claim 1 wherein each particle or small groups of particles is contained in a fluid permeable membrane.

3. A reactor as claimed in claim 2 wherein said fluid permeable membrane is a pervious sack.

4. A reactor as claimed in any one of claims 2 or 3 where at least 50% of the particles are each electrically insulated from adjacent particles.

5. A reactor as claimed in any one of claims 2 or 3 where at least 80% of the particles are each electrically insulated from adjacent particles.

6. A reactor as claimed in any one of claims 1, 2 or 3 wherein the conductive particles are made of graphite.

7. A reactor as claimed in any one of claims 1, 2 or 3 wherein the conductive particles are made of coke.

8. A reactor as claimed in any one of claims 1, 2 or 3 wherein the conductive particles are made of briquetted carbon.

* * * * *